(12) United States Patent
Tanner

(10) Patent No.: US 7,460,768 B2
(45) Date of Patent: Dec. 2, 2008

(54) AUDIO-ONLY COMBINED DVD AND CD PLAYER

(76) Inventor: Chris Tanner, 861 Corporate Dr. #201, Lexington, KY (US) 40503

( * ) Notice: Subject to any disclaimer, the term of this patent is extended or adjusted under 35 U.S.C. 154(b) by 1041 days.

(21) Appl. No.: 10/825,468

(22) Filed: Apr. 15, 2004

(65) Prior Publication Data

US 2005/0232608 A1 Oct. 20, 2005

(51) Int. Cl.
*H04N 5/00* (2006.01)
(52) U.S. Cl. .................................... 386/126
(58) Field of Classification Search ............ 386/126, 386/125
See application file for complete search history.

(56) References Cited

U.S. PATENT DOCUMENTS

| | | | | |
|---|---|---|---|---|
| 5,828,859 | A | * 10/1998 | Tanihira et al. | 712/200 |
| 6,067,301 | A | * 5/2000 | Aatresh | 370/418 |
| 6,262,545 | B1 | * 7/2001 | Yamamoto | 318/400.2 |
| 2001/0026504 | A1 | * 10/2001 | Nonaka et al. | 369/32 |
| 2004/0005145 | A1 | * 1/2004 | Chen | 386/116 |

* cited by examiner

*Primary Examiner*—Thai Tran
*Assistant Examiner*—Tat Chi Chio
(74) *Attorney, Agent, or Firm*—Chris Tanner, Esq.

(57) ABSTRACT

This invention relates generally to a DVD-CD player which plays conventional CD audio as well as the audio portion of DVDs. A mechanism for sightlessly navigating video menus normally visible on a DVD display is also included.

10 Claims, 9 Drawing Sheets

AUDIO-ONLY COMBINED DVD AND CD PLAYER

CROSS-REFERENCE TO RELATED APPLICATIONS

This application claims priority to Provisional Application No. 60/540,384, filed Jan. 30, 2004.

FIELD OF THE INVENTION

This invention relates generally to a DVD-CD player which plays the audio portion of DVDs as well as conventional CD audio.

BACKGROUND OF THE INVENTION

Consumers invest significant budget in DVDs, primarily for home use. During long road trips in a car, a consumer may wish to play a DVD in an audio-only non-visual context, but can't unless they have a DVD player in the vehicle. Although many vehicles have DVD players installed therein, these are generally for use by passengers only and seldom for use by the driver, as such use would not be safe due to a potential problem with visual distraction. However, it is long established that a driver doing a limited amount of selecting and operating of a radio or CD player is acceptable without fear of distraction. Consequently, a means of playing the audio-only portion of DVDs using radio and CD button conventions yet without distracting a driver is desired.

BRIEF SUMMARY OF THE INVENTION

It is an object of the present invention to provide an audio DVD-CD device, comprising: a playback system for playing audio from both CD and DVD discs; a data manager located within said playback system; and a user-accessible button panel and an on screen display both electronically connected to said playback system, for duplicating the functionality of a DVD selection panel so as to enable a user to make selections that appear on the screen even though no video portion of the DVD is displayed.

It is another object of the present invention to provide a console display controller which retrieves decoded non-stripped digital video data, decodes the information where possible, and communicates with the console display to show system information, e.g. configuration menus, time, channel volume, language, and scene, all of which are customary user-option features within a typical DVD. It is yet another object of the present invention to provide a video processor which separates bitmap signals from other non-video data modules and then interprets and displays them onto the console display, and retrieves bitstream information from the bus after being routed through the MPEG interface and the post-parser, decodes that data, and provides all displayable portions of the resulting decoded information to the console display;

It is yet another object of the present invention to parse decision making data regarding advancing the DVD for the console display controller; where a video processor also has a memory is used to buffer, strip, and interpret the video information if possible; and further wherein a 'φ' symbol or warning beep or noise is displayed if the user makes an illogical choice.

These and other objects and advantages of the invention will become readily apparent as the following description is read in conjunction with the accompanying drawings.

DETAILED DESCRIPTION OF THE PREFERRED EMBODIMENTS

Figure 1:
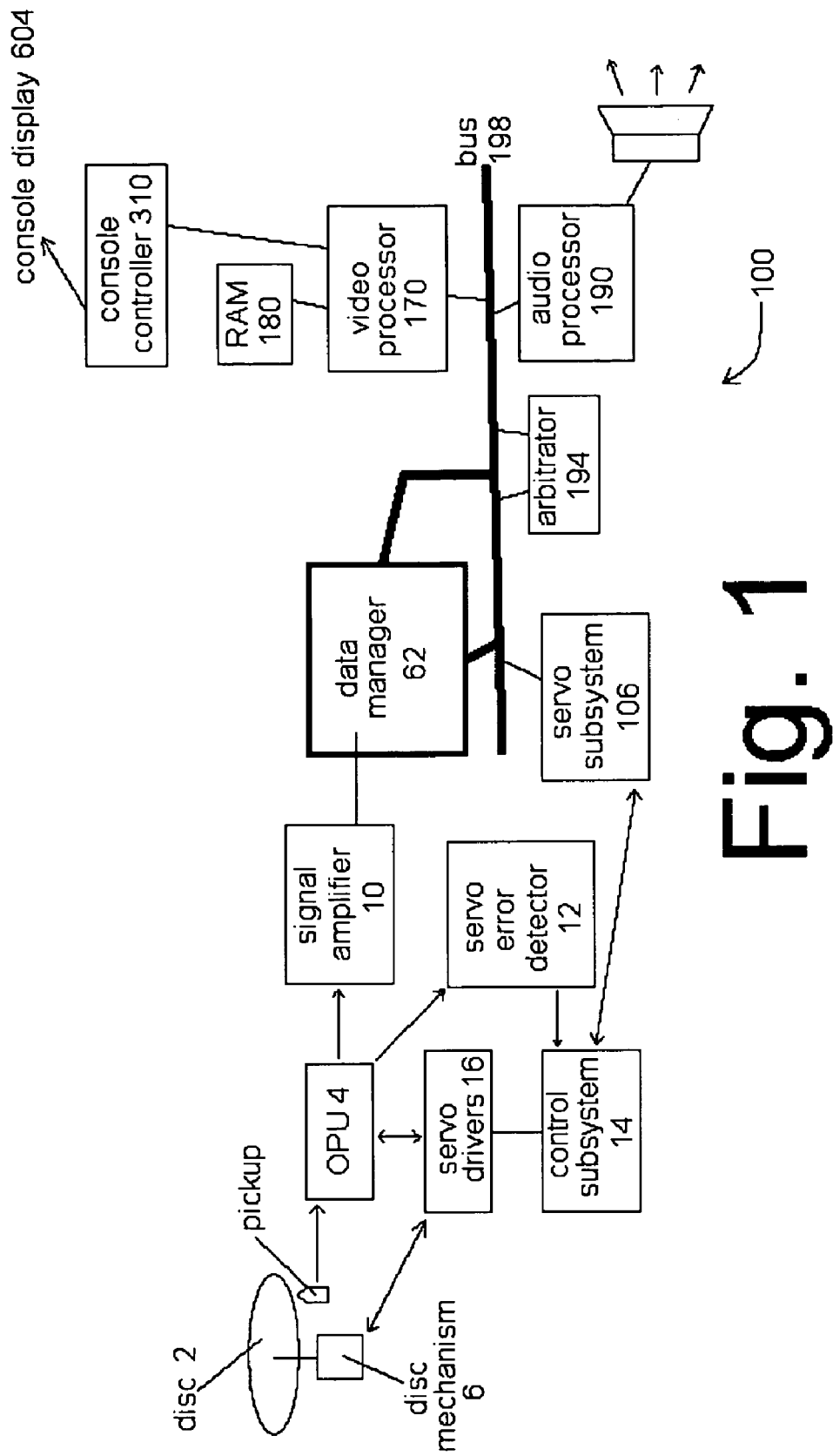
FIG. 1 is a plan view of the present invention.

FIG. 1 depicts a playback system 100 used for reproducing information stored on CDs and DVDs and includes a disc motor 6 for rotating disc 2, an optical pickup (OPU) subsystem 4, a signal amplifier 10, a servo error detector 12, servo control subsystem 14, and servo drivers 16.

The disc motor 6 includes a collection of spindle motors which rotate the disc 2 to a variety of desired speeds, depending on whether a CD or DVD is being operated, various user selections, and internal resistance factors. The servo drivers 16 output signals to the disc motor 6 to drive and control the rate of rotations of the various motors contained in disc motor 6. The servo drivers 16 also output signals to position OPU 4 on the desired location of disc 2, to focus the laser beam onto disc 2, and to track the recorded spiral pits on disc 2.

As the disc 2 rotates, the OPU 4 reads information stored on the CD or DVD disc 2 by scanning the pits and lands on optical disc 2. The OPU 4 may contain one or more lasers, optical elements, and associated electronic circuitry, and reads the information stored on disc 2 by detecting the laser beam reflected from disc 2. The OPU 4 is usually mounted on a sled which physically positions the OPU 4 over disc 2, and is capable of reading information from both DVDs and CDs. The photo-diode voltages generated by the reflected laser beam are supplied to signal amplifier 10 which equalizes the signal representing information read from the disc 2.

A servo error detector 12 generates servo error control signals which are fed back to a servo control subsystem 14. The servo error signals include a focus error signal, a tracking error signal, and a track-crossing pulse. Based on the servo error signals received from servo error detector 12, the servo control subsystem 14 determines and controls the speed of rotation of disc 2 using servo drivers 16, and also adjusts the height and position of the OPU 4 for reading information from disc 2.

The servo subsystem 106 also receives servo error control signals generated by servo error detector 12 as input, and also receives Hall sensor output from the disc motor 6 for the detection of disc rotation speed. Servo subsystem 106 manages signals from four closed-loop servos, including a disc motor servo, a sled servo, a focus servo, and a tracking servo. The servo subsystem 106 also receives sync pattern information from the read channel subsystem 18 contained within the data manager 62. Based on the servo error control signals and sync pattern information, the servo subsystem 106 outputs control voltages to the servo control subsystem 14 to correct the rotation speed of disc 2, to move the sled which houses the OPU 4 to the correct track, to vertically move the OPU 4 to a proper distance from the disc 2 for focusing purposes, or to correct off-track errors. Functions performed by the servo subsystem 106 correspond to step 572 in the flowchart within FIG. 5.

Many of the components within the playback system 100 use a bus 198 to access each other. To do this they make bus access requests of the arbitrator 194 prior to obtaining access. Each access request is typically processed according to a priority scheme, unless there is an exceptional circumstance such as the failure of a memory device, a safety signal that power is about to be lost, or that the disc 2 is being removed. The priority scheme is typically based on the priority given to a specific device and the order in which the bus access requests are received. The priority scheme is set up so that no device monopolizes the bus 198, thereby avoiding the starving of the other devices. The arbitrator 194 has a queuing module designed to share the bus 198 so that no device attached therein can use more than approximately 40% of the bus's total available bandwidth.

The various components of the playback system 100 can be located on one integrated circuit die, but also can be separate non-integrated components in any combination. Furthermore, the present invention accounts for and works with existing CD/DVD architectures and can be adapted to fit within a variety of CD/DVD configurations. Specifically, the playback system 100 can accept data from pre-fabricated CD/DVD modules that already have all the logic for sensing data from the disc lenses, motors, and optical devices. In such a case, various of the OPU 4, motor 6, error detector 12, and control subsystem 14 can be unused and instead the rest of FIG. 1 is connected directly to the pre-fabricated disc sensing mechanisms.

The data manager 62 is optimized to efficiently separate and process audio information read from a disc 2, and does so by receiving inputs from signal amplifier 10 and servo error control signals from the servo error detector 12. Based on these inputs, the data manager 62 performs servo operations, bit clock and data extraction, conversion of analog input signals to digital signals, sync detection and demodulation of CD and DVD data, error detection and correction of CD and DVD data, de-scrambling of DVD data, and links directly to the bus 198.

Figure 2:
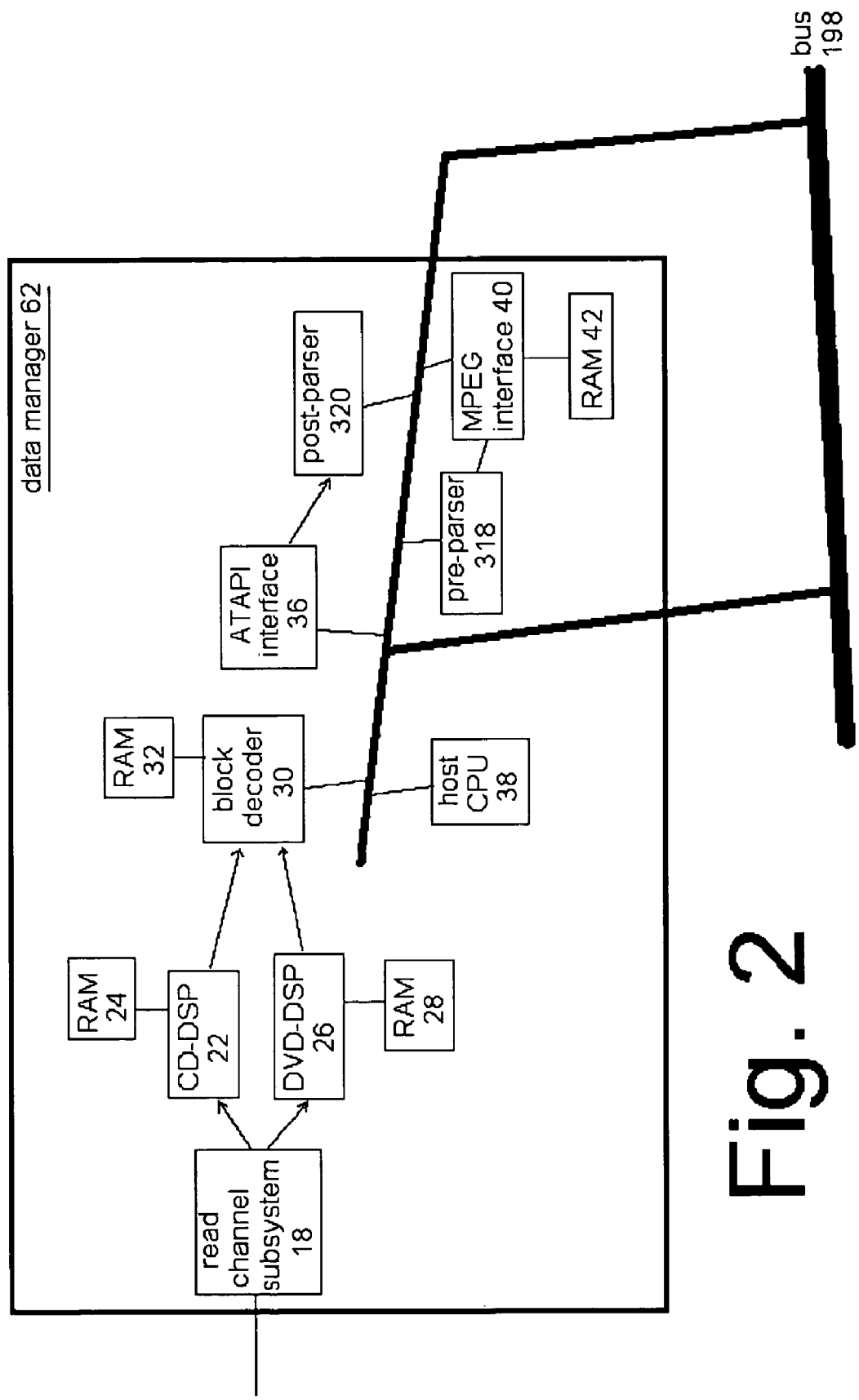
FIG. 2 is a detailed view of a first embodiment of the data manager of FIG. 1.

FIG. 2 shows details of a first embodiment of the data manager 62, including a read channel subsystem 18, a CD digital signal processor (CD-DSP) 22 and its associated memory 24, a DVD DSP 26 along and its associated memory 28, a block decoder 30 along with its associated memory 32, an Advanced Technology Attachment Packet Interface (ATAPI) interface 36, and a host system central processing unit (CPU) 38.

The read channel subsystem 18 extracts bit clock and bit data information commonly associated with CDs and DVDs from the output of the signal amplifier 10. The digital bit stream generated by RC subsystem 18 is provided either to CD-DSP 22 or to DVD-DSP 26 depending on whether playback system 100 is operating in CD or in DVD mode. The read channel subsystem 18 receives the equalized signal from signal amplifier 10 and converts the analog signal to digital using baseline tracking techniques, where it then extracts clock and data information. Functions performed by the read channel subsystem 18 correspond to step 574 in the flowchart of FIG. 5.

The CD-DSP 22 demodulates channel bits read from a CD into data bytes and performs error detection and correction on the data bytes. A memory 24 coupled to the CD-DSP 22 facilitates de-interleaving, error detection, and error correction operations. The output from the CD-DSP 22 is provided to block decoder 30 or to the MPEG interface 40 via a serial connection. Although other types can be used, MPEG decoders are often implemented using a serial connection. The block decoder 30 performs data block error correction on the CD data and converts the data blocks received from CD-DSP 22 into CD blocks. A memory 32 facilitates functions performed by block decoder 30 and also acts as buffer memory for the ATAPI interface 36.

The DVD-DSP 26 demodulates channel bits read from a DVD into data bytes and performs error detection and correction on the data bytes, and also converts the DVD data into the DVD data sector format data, as described in more detail in connection with FIGS. 8 and 9. A memory 28 coupled to DVD-DSP 26 facilitates the demodulation, error detection/correction, and data sector formatting operations.

The ATAPI interface 36 facilitates the transfer of CD data blocks and DVD sector data to the host system CPU 38 using the system bus 198. The MPEG decoder 40 decompresses and separates the compressed audio and video data. The decompressed video data would normally be output to video playback subsystem 46 for MPEG video playback. The user bit rate is only 1.4112 Mbit/sec for 1×CD. Conversely, DVD technology uses a much higher user bit rate (11.08 Mbit/sec for 1×DVD) than that of CD. However, within the present invention most of the decompressed video data is stripped off and discarded, although a minimal amount is interpreted potentially for displaying choices to a user, where applicable. The decompressed MPEG audio is output to audio playback subsystem 190 for MPEG-audio or AC3 audio playback through the bus 198.

The ATAPI interface 36 and host CPU 38 are typically required for CD and DVD applications. For a typical DVD/CD playback system that displays video, a 2 times DVD speed (2×DVD) or 8 times CD (8×CD) speed is adequate for non-jerky MPEG playback. The present invention, however, requires significantly less resources because it strips and discards most video data, extracting, interpreting, and displaying only a minimal amount of menuing information.

The microcontroller (CPU) 38 performs various housekeeping functions such as register configuration or initial setup of the playback system 100 by providing read and write capabilities for the various registers and memory locations, and also monitors the flow of data within the various components therein. The microcontroller 38 may also assist in controlling the MPEG decoder 40.

The ATAPI 36 receives and parses the encoded multimedia bitstream from the block decoder 30. The pre-parser 318 determines the substream membership of each data packet from the packet header and routes the packet contents (minus identifying fields from the packet header) to the appropriate elementary bitstream buffer in memory 32, where they wait on the availability of the associated module to begin being processed. Certain data packets (e.g. SPU substream, navigation substream) are retrieved directly from the appropriate buffer in memory 32 by the associated module. However, many of these data packets may have variable-length encoded data (e.g. compressed audio and video). These data packets are passed to the post-parser 320, which can parse the bitstream syntax and perform elementary operations such as extracting the bit allocation and scaling information from the headers, and applying that information to convert the variable-length encoded data into fixed-length transform coefficients which are easier for subsequent modules to process.

Because the ATAPI standard is popular and often used in existing prefabricated disc playback devices, and because the playback system 100 of the present invention can be implemented either in a stand-alone mode or in combination with other pre-fabricated integrated circuits, the second embodiment of the data manager 62 does not include an ATAPI interface. This is because it would be redundant to attach the present invention to an integrated circuit which already has an ATAPI interface, but also because a data manager 62 which doesn't have an ATAPI interface can still perform significant data management, decompression, error correction, buffering, and MPEG processing for some other integrated circuit. Also, the various memory devices 24, 28, 32, and 42 within the data manager 62 show in FIG. 2 are in FIG. 3 consolidated into a single multi-port memory device 102, thereby reducing silicon and fabrication space, as well as reducing connection lines and data management logic.

Figure 3:
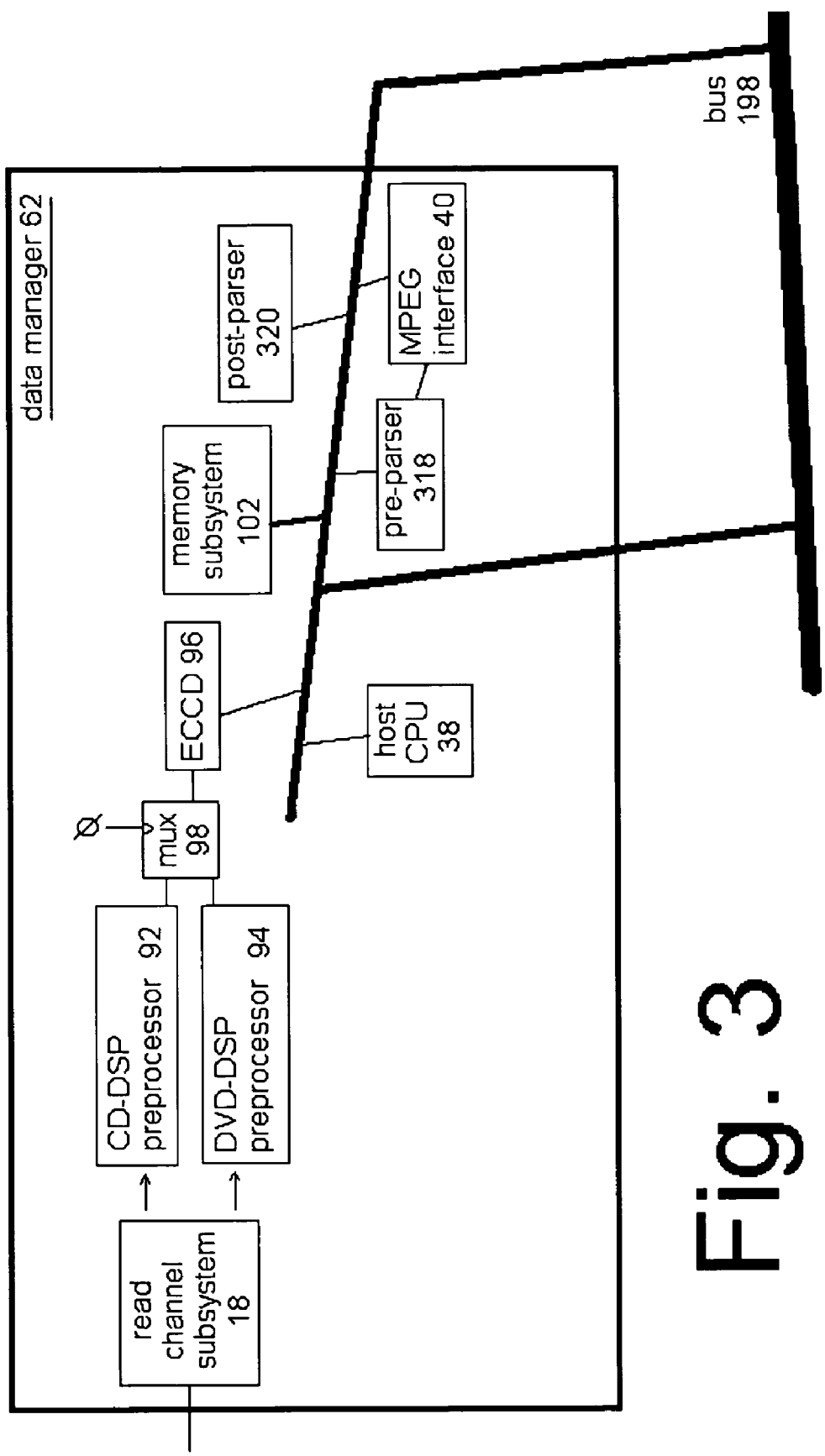
FIG. 3 is a detailed view of a second embodiment of the data manager of FIG. 1.

Accordingly, FIG. 3 depicts a detailed block diagram of a second embodiment of the data manager 62, which includes a read channel subsystem 18, a CD-DSP preprocessor 92 and a DVD-DSP preprocessor coupled thereto, a multiplexer 98 for receiving signals from the CD-DSP preprocessor 92 and DVD-DSP preprocessor 94, an error code correction and detection (ECCD) subsystem 96, an aggregated memory subsystem 102, and an MPEG interface 40.

The CD-DSP preprocessor 92 performs sync detection and demodulation functions on the input CD data signal as defined by the Red Book standard. Typically, EFM (eight-to-fourteen) demodulation is performed on CD data. The DVD-DSP preprocessor 94 performs sync detection and demodulation functions on the input DVD data signal as defined by standards published by the DVD consortium. Typically, EFMPlus demodulation is performed on DVD data. The sync information detected by preprocessors 92 and 94 is forwarded to the servo subsystem 106. Functions performed by CD-DSP preprocessor 92 correspond to step 578 in FIG. 5, while functions performed by DVD-DSP preprocessor 94 correspond to step 582. Depending on whether the playback system 100 is in CD or DVD mode, the multiplexer 98 selects either the output from CD-DSP preprocessor 92 or DVD-DSP preprocessor 94 to be written to memory subsystem 102.

The ECCD subsystem 96 is responsible for performing error detection and correction for both CD and DVD data. The ECCD subsystem 96 reads CD or DVD data written to memory subsystem 102 by CD-DSP preprocessor 92 or DVD-DSP preprocessor 94. The ECCD subsystem 96 performs these reads using non-sequential memory read operations which allow de-interleaving of the data that is read out. ECC subsystem 96 then performs error detection and correction on the data as defined by the Red Book standard for CD data and by standards published by the DVD consortium for DVD data. After performing error detection and correction, the corrected data is written back to memory subsystem 102.

The memory subsystem 102 also provides memory resources for other internal operations of the data manager 62. The memory subsystem 102 provides a common memory resource for processing performed by CD-DSP preprocessor 92, DVD-DSP preprocessor 94 and ECCD subsystem 96, and provides memory resources for storing data processed by preprocessors 92 and 94. This data is read by ECCD subsystem 96 for error detection and correction purposes. The corrected data is then written back to the aggregated memory subsystem 102 until such time as it is read out by the MPEG interface 40. By aggregating and allowing sharing of the memory resources for preprocessors 92 and 94, ECCD subsystem 96, and MPEG interface 40, the second embodiment of the data manager 62 reduces the number of memory chips required to support the various components, thus reducing complexity and cost of the playback system 100.

The second embodiment of the data manager 62 can also include a pre-parser 318 and a post-parser 320, although these components can also be either disabled or not included in those situations where portions of the playback system 100 of the present invention are incorporated within pre-designed architectures which already have pre- and post-parsers.

Figure 4A:
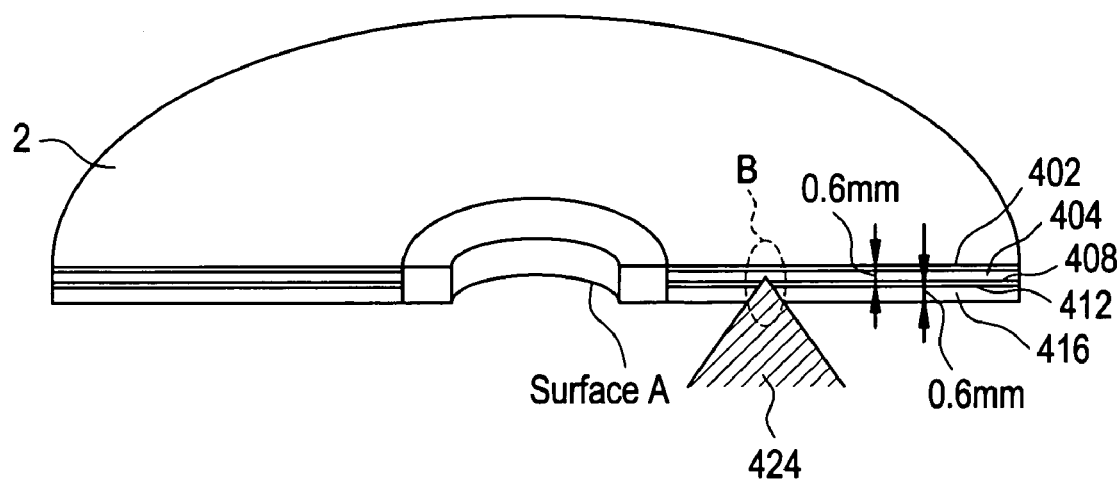
FIG. 4 is a detailed view of a disk for use within the present invention.
Figure 4B:
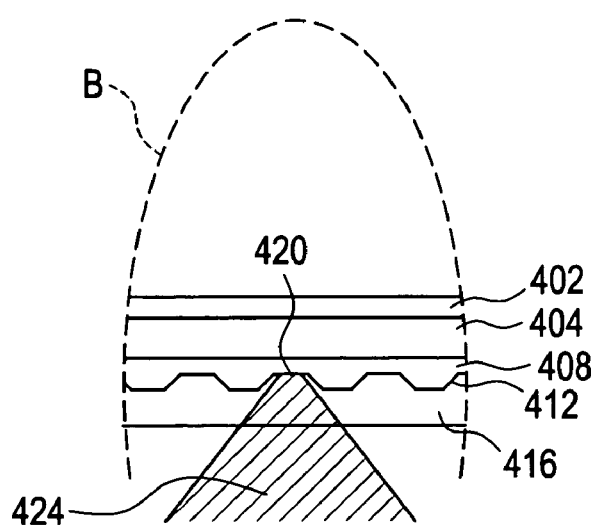

FIG. 4A is a cross-sectional view of the disc 2. FIG. 4B is an enlarged cross-sectional view of portion B shown in FIG. 4A. As shown in FIG. 4A, a DVD is formed by laminating a first transparent substrate 416, an information layer 412, an adhesive layer 408, a second transparent substrate 404, and a print layer 402 for locating labels. The first transparent substrate 416 and the second transparent substrate 404 can be reinforcement substrates that are formed of the same material. An adhesive layer 408 provided between the information layer 412 and the second transparent substrate 404, thereby adhering the information layer 412 to the second transparent substrate 404.

On the face of the information layer 412 in contact with the first transparent substrate 416 is formed a reflective film, which is formed of a thin metal film or the like. A high density of convex and concave pits are formed on the reflective film.

As shown in FIG. 4B, when a light beam 424 is radiated on the disc 2 by the disk mechanism 6, a light spot 420 is formed on the information layer 412. The information stored on the disc 2 is detected as variation in the reflectance of the portion of the information layer 412 which is illuminated by the light spot 420. The diameter D of the light spot 420 of a DVD is about 5/8 of the diameter of a light spot on a CD because the numerical aperture (NA) of an object lens for DVDs is larger than the NA of an object lens for CDs and because the wavelength of a light beam for DVDs is smaller than the wavelength of a light beam for CDs. Accordingly, a DVD having the above-described physical structure can store about 4.7 Gbytes of information on one side, which is nearly 8 times the storing capacity of a conventional CD.

The fundamental technology which realizes such large storing capacity lies in reduction of the spot diameter D of the light beam. The spot diameter D is calculated from the following formula: Spot Diameter D==Laser wavelength/NA of the object lens. Accordingly, the spot diameter D can be minimized by decreasing the laser wavelengths and increasing the NA of the object lens. The sizes of the spot diameter and laser wavelengths are calibrated by the optical processing unit (OPU) 4, in combination with the servo subsystem 106 and the servo drivers 16 through the control subsystem 14. However, increasing the numerical aperture NA of an object lens can result in coma aberration due to the relative slant (i.e., "tile") between the disk surface and the optical axis of the light beam. In the case of DVDs, such coma aberration is minimized by reducing the thickness of a transparent substrate. Unfortunately, reducing the thickness of a transparent substrate can result in a separate problem of lower mechanical strength of the disk. In the case of DVDs, the strength of the transparent substrate is reinforced by attaching a reinforcing substrate to the transparent substrate, thereby overcoming the problems associated with the mechanical strength of the disk. A red semiconductor laser having a short wavelength of 650 nm and an object lens having a large NA of about 0.6 mm are used by the OPU 4 and the pickup to read out the information stored on a DVD.

Figure 5:
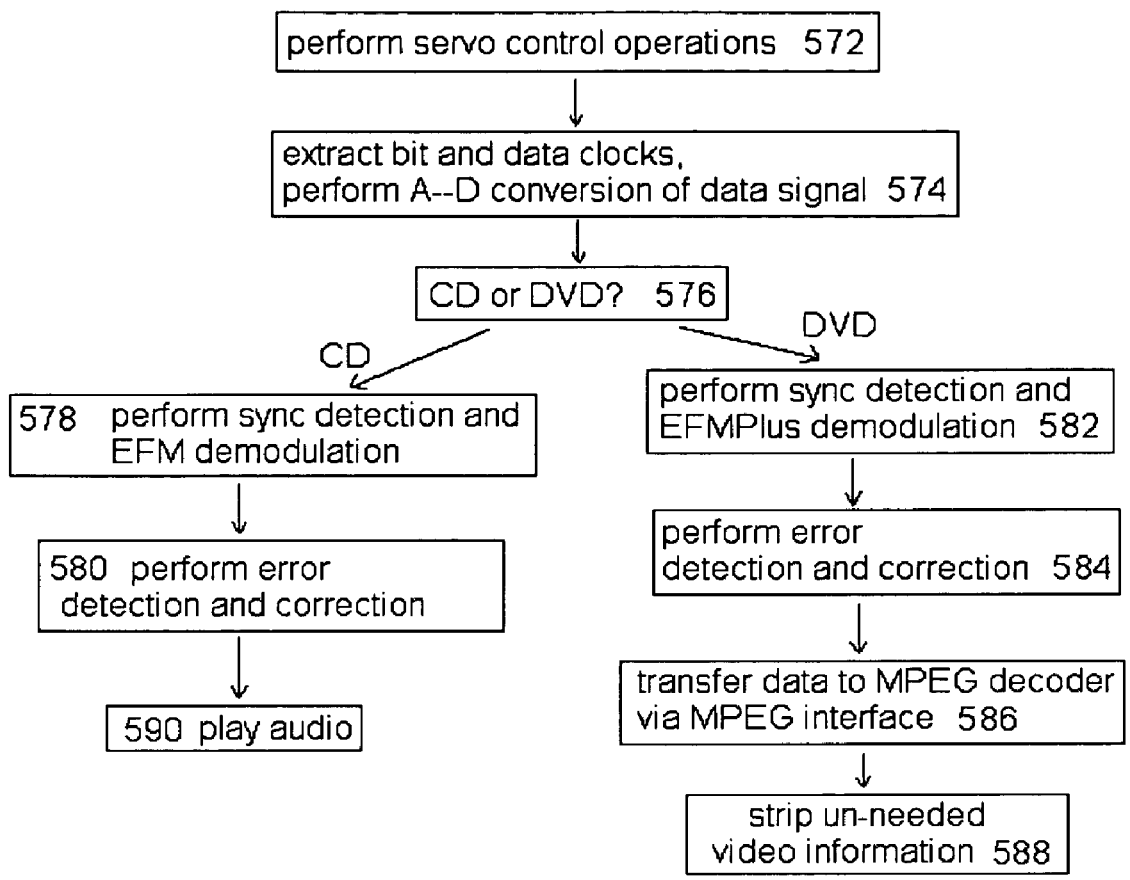
FIG. 5 is a flowchart showing the steps taken by the present invention.

FIG. 5 is a flowchart showing the steps performed by data manager 62 for processing CD and DVD information. First, the data manager 62 receives an input signal from signal amplifier 10 and servo error control signals from the servo error detector 12. Based on the servo error control signals, the data manager 62 performs servo control operations, as shown at step 572. Examples of servo control operations include open-loop and closed-loop operations such as sending appropriate control signals to servo drivers 16 to control the rate of rotation of disc 2, calibrating the servo signals, and sending appropriate signals to the OPU 4 to minimize tracking and focus errors, partially by varying the spot diameter and laser wavelengths as described above.

At step 574, the data manager 62 performs read channel block operations which include extracting bit clock and data clock from the signal received from the signal amplifier 10, and converting the input analog signal to a digital signal using DC baseline tracking methods. By detecting the header information and sync patterns on the disc 2, the data manager 62 can differentiate between a CD and a DVD disc and thus determine the mode of operation. Thus, at step 576, data manager 62 determines whether the playback system 100 is operating in CD mode or DVD mode. If a disk is damaged, mismarked, or indeterminate, the data manager 62 may try out both CD and DVD modes until a proper mode is determined.

If the playback system 100 is operating in CD mode, at step 578 the data manager 62 performs sync detection and demodulation functions on the CD data as defined by the Red Book standard. Eight-to-Fourteen (EFM) modulation is performed in reverse, resulting in fourteen-to-eight demodulation techniques which can be used for processing CD data. At step 580, the data manager 62 performs error detection and correction of the CD information.

If the playback system 100 is operating in DVD mode, at step 582 the data manager 62 performs sync detection and demodulation functions on DVD data as defined by DVD standards published by the DVD Consortium. EFMPlus (sixteen-to-eight) demodulation techniques can be used for processing DVD data, although the present invention should not be considered as limited thereto. At step 584, the data manager 62 performs error detection and correction of the DVD data. At step 586, DVD data is then transferred to MPEG decoder 40 via an MPEG interface, but in the present invention most of the video information is first stripped and discarded at step 588.

Figure 6:
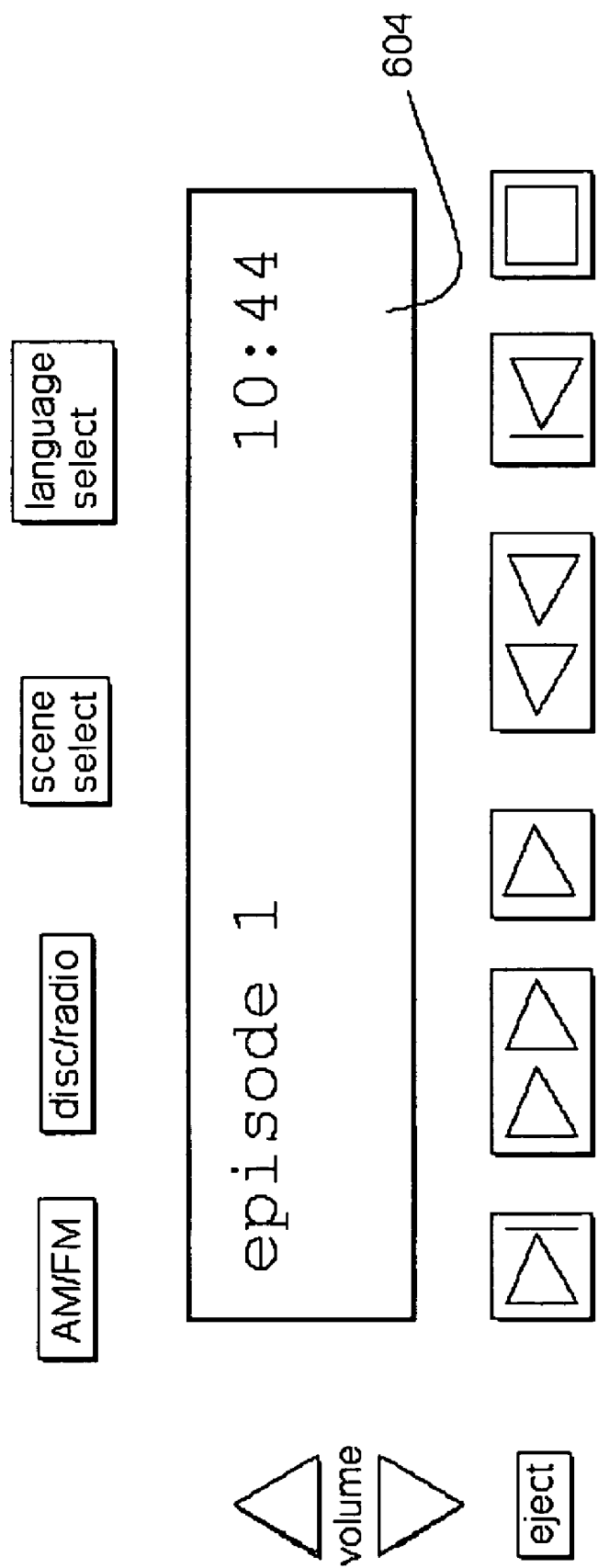
FIG. 6 shows an exemplary console display of the present invention.

The console display controller 310 retrieves decoded non-stripped digital video data from a buffer in the memory 204, decodes the information where possible, and communicates with the console display 604. As shown in FIG. 6, the console display 604 shows system information, e.g. configuration menus, time, channel volume, language, scene, etc. A video processor 170 (FIG. 1) is also employed for separating bitmap signals from other non-video data modules and then interpreting and displaying them onto the console display 604. The video processor 170 retrieves bitstream information from the bus 198 after being routed through the MPEG interface 40 and the post-parser 320, decodes that data, and provides all displayable portions of the resulting decoded information to the console display 310.

Because DVDs come in a wide variety of formats, decision making data is sometimes available which can be parsed and interpreted for the display controller 310. Unfortunately, within some DVDs no user decision information is available. Within the video processor 170, a memory 180 is used to buffer, strip, and interpret the video information if possible. The video processor 170 then outputs that information to the display controller 310. The actual interpretation is performed by software loaded within the memory 180. This is convenient because as stated DVD protocols for allowing users to menu-hop through user-choice information are continually changing, thus the ability to tool up an integrated circuit product is easier when software can be loaded and written onto that integrated circuit, rather than a non-changeable hardware interpretation.

Figure 7:
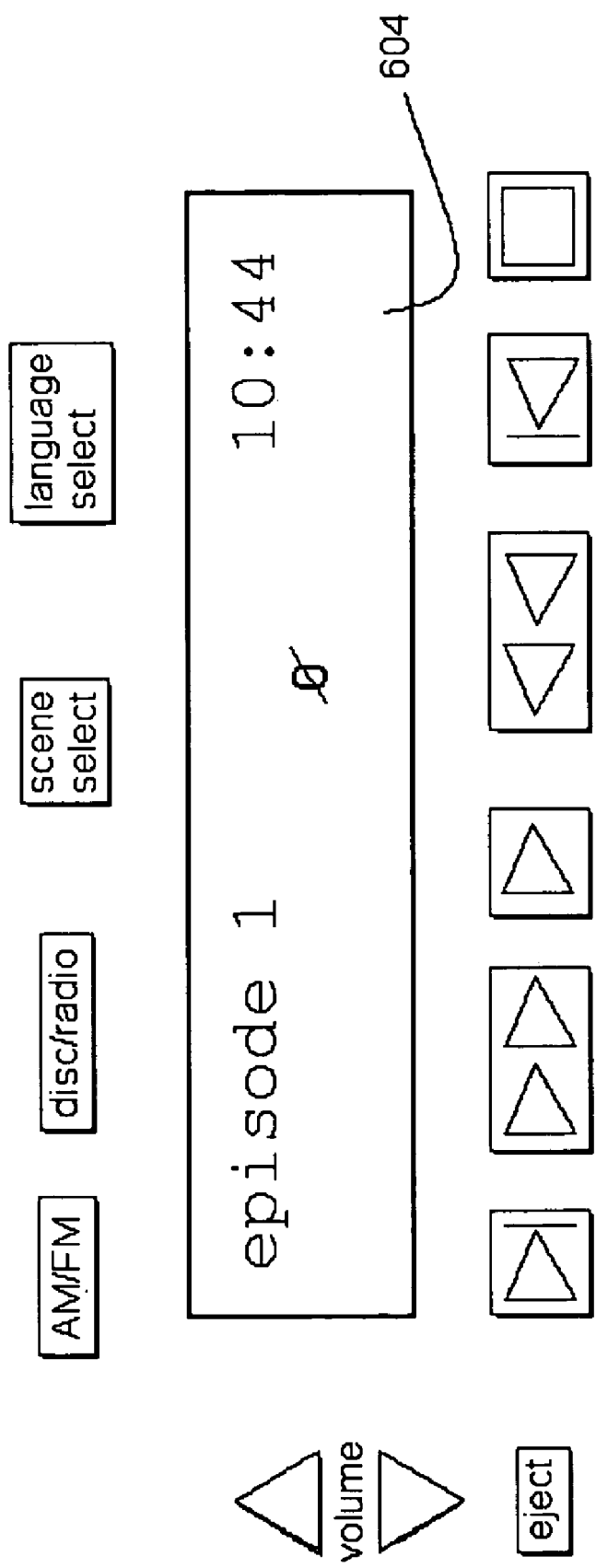
FIG. 7 shows specific features of the console display of FIG. 6.

Generally, after loading, an entertainment DVD is programmed to force a user to make at least one choice before playing occurs, where these choices are mapped to different selection areas of a video display. That choice may merely be to press "play", but if the operator cannot see this, they must guess what button on the console 604 corresponds to that selection area. Some DVDs that were adapted using lower cost processes start the video entertainment immediately upon loading. However, most entertainment DVDs require at least one menued choice by a user before the playing process starts. This choice may be as simple as clicking on a simple "play movie" box normally displayed on a viewing display such as a TV or computer. The CD-DVD player of the present invention is optimally suited for either of the above scenarios, in that the fewer the display-area menu choices, the less "blind choices" and guesses that the user must make. Also, if a user makes a non-permitted illogical choice, such as attempting to select multiple languages where only one language is contained on the DVD, a '$\phi$' symbol can be displayed, as shown in FIG. 7. An optional warning beep or noise can also be emitted when an non-permitted choice is entered by the user.

The audio processor 190 receives audio data from the post-parser 320 through the bus 198. The audio decoder 316 is configurable to parse the audio bitstream side information from data header fields and to convert transform coefficients into digital audio samples, and is further configurable to re-assemble LPCM audio data into digital audio samples.

The audio processor 190 may be configured to retrieve audio data directly from the elementary audio bitstream buffer from the post-parser 320 with the permission of the bus arbitrator 194, or may also be configured to receive audio data directly from the MPEG decoder 40, where it tracks the location of the next byte to be retrieved using an audio bypass buffer pointer. The audio processor 190 is also configured to maintain a loose synchronization with the MPEG decoder 40 to avoid introducing any undesired delays between reproduced audio signals.

Figure 8:
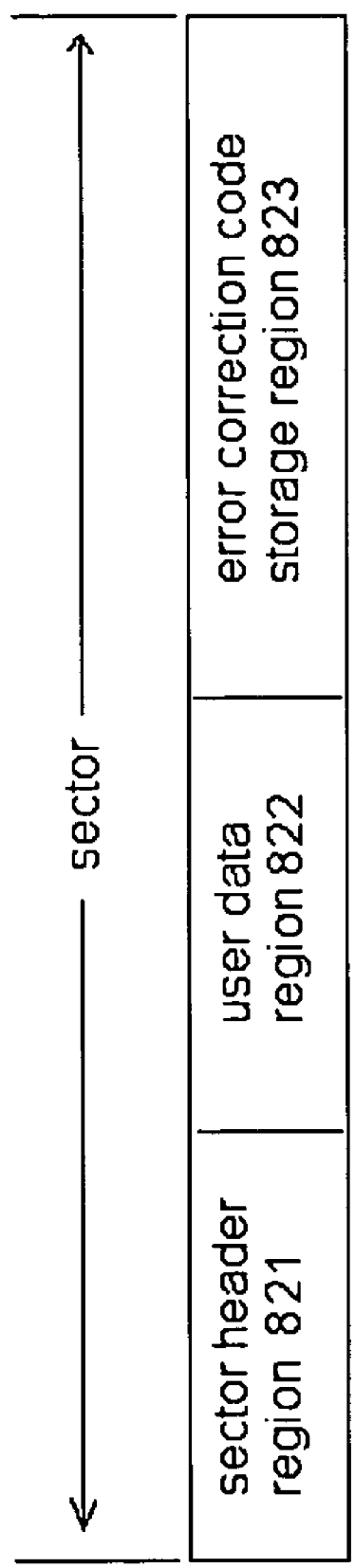
FIG. 8 shows the logical data structure of a CD disk as mapped within the present invention.

FIG. 8 shows the logical data structure of a CD disc. The CD includes a sector header region 821, a user data region 822, and an error correction code storage region 823. The sector header region 821 stores a sector address for identifying the sector and an error detection code thereof. Based on these sector addresses, the block decoder 30 and CD preprocessor 92 determine which of a plurality of sectors' data should be read from. The user data region 822 stores a data string which can be 2 Kbytes long, although other lengths can also be used. The error correction code storage region 823 stores error correction codes for the sector header region 821 and the user data region 822 within the same sector, which are interpreted by the ATAPI interface 36 shown in FIG. 2, and the ECCD 96 of FIG. 3.

Figure 9:
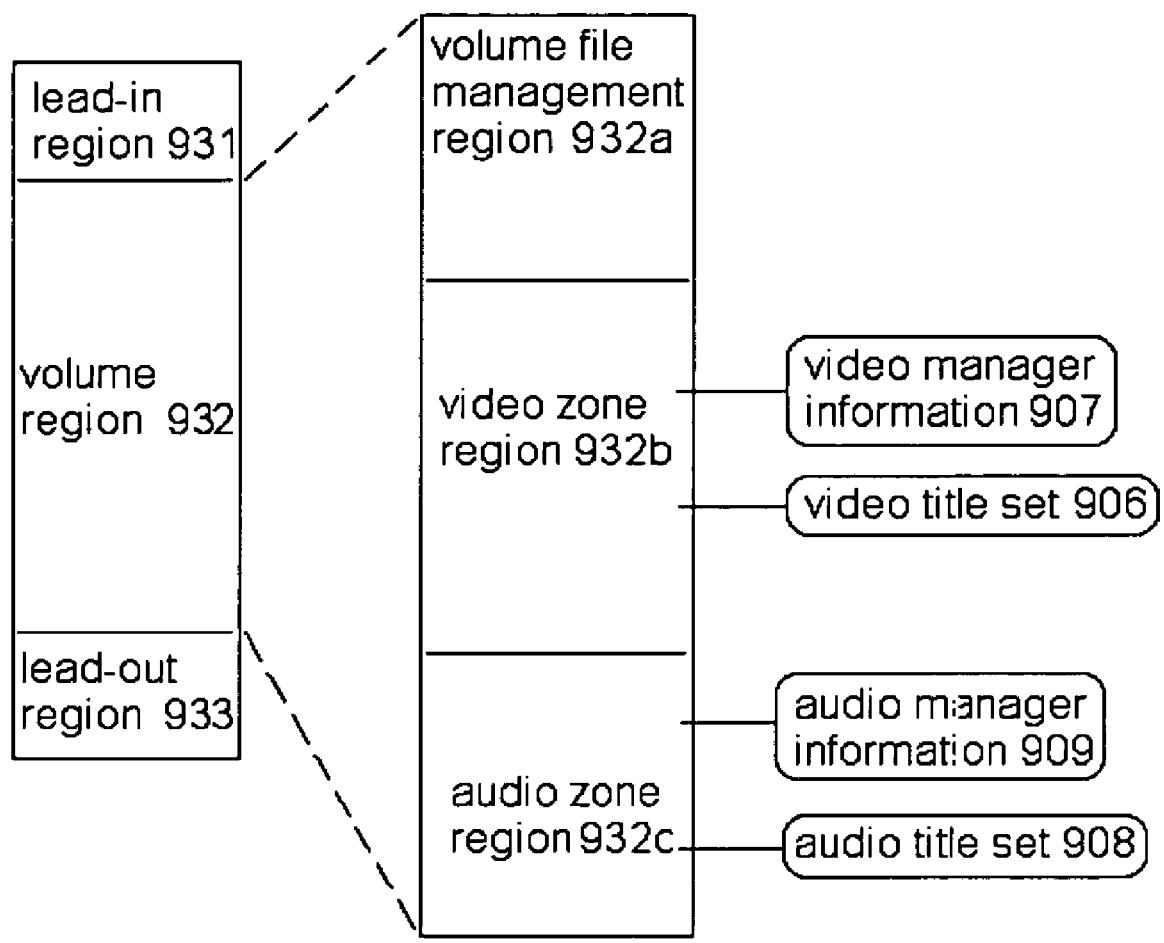
FIG. 9 shows the logical data structure of a DVD disk as mapped within the present invention.

FIG. 9 shows the logical data structure of a DVD disc. The DVD includes a lead-in region 931, a volume region 932, and a lead-out region 933. These regions can be identified by the identification information included in the sector addresses of physical sectors. The physical sectors are arrayed in an ascending order based on their sector addresses. In the lead-in region 931, data for stabilizing the operation of a disk reproduction apparatus at the beginning of a read are stored, somewhat like a test pattern. No meaningful data is stored in the lead-out region 933 which is instead used for informing the playback system 100 of the end of reproduction. The volume region 932 stores digital data corresponding to each application.

As shown in FIG. 9, the volume region 932 is subdivided into a volume file management region 932a, a video zone region 932b, and an audio zone region 932c. The volume file management region 932a stores file system management information for managing a plurality of logic blocks as files in accordance with the International Standards Organization (ISO) 13346 standard. The file system management information indicates the correspondence between the name of each of a plurality of files and the addresses of the logic blocks occupied by that file. Thus, the playback system 100 achieves file-by-file access from a DVD 2 based on the file system management information described above.

The MPEG interface 40 accomplishes this by obtaining the addresses of the logic blocks corresponding to a given file name, and accessing those logic blocks based on these addresses. As a result, the digital data contained in the desired files can be read out.

The video zone region 932b stores video manager information 907 and one or more video title sets 906. A video title set 906 contains a plurality of video data and management information for managing the order of reproducing the high volume of video data packets in real time. The video title set 906 has a data structure that allows management of the video data in units which are referred to as video titles. For example, if the video title set 906 is a video application, the video titles may correspond to a plurality of video versions, e.g., a theatrical version, non-abridged version, alternate language version, and the like. The video manager information 907 contains information representing a table of contents consisting of a plurality of video title sets 906. Typically, the video manager information 907 includes information required for displaying a video menu for allowing a user to select a desired one of a plurality of video title sets 906 and the management information thereof. This information and display area designations are interpreted and mapped to buttons on the user console by the video processor 170 and console controller 310 shown in FIG. 1. Meanwhile, the audio zone region 932c stores audio manager information 909 and one or more audio title sets 908.

The audio title set 908 contains a plurality of audio data and management information for managing the order of reproducing the plurality of audio data. The audio title set 908 has a data structure that allows management of the audio data in units which are referred to as audio titles. The audio title set 908 can also contain management information defining the order of reproducing the video data contained in the video title set 906, which is convenient for the present invention because such information can be parsed and directly displayed on the console display 604 with only minimal processing required. Similarly, the audio manager information 909 contains information representing a table of contents consisting of a plurality of audio title sets 908.

In FIG. 9, the video title set 906 and the audio title set 908 are each illustrated as one file. In practice, however, the video title set 906 or the audio title set 908 is very often composed of a plurality of consecutive files because moving image data has such an enormous data size that trying to accommodate the entire moving image data into one file may result in a file size of more than 1 GB. The video zone region 932b stores video manager information 907 and one or more video title sets 906.

It is anticipated that various changes may be made in the arrangement and operation of the system of the present invention without departing from the spirit and scope of the invention, as defined by the following claims.

What is claimed is:

1. An audio DVD-CD device, comprising:
   a playback system for playing audio from either a CD disc or a DVD disc depending on which type of disc is inserted at a given moment;
   a data manager located within said playback system; and
   a user-accessible button panel and an on screen display both electronically connected to said playback system, for duplicating the functionality of a DVD selection panel so as to enable a user to make playback selections native to the DVD content that would normally be selectable from a display of a DVD player except that no such display exists and no video portion of the DVD is displayed;
   a data bus;
   a disc motor for rotating the disc, responsive to signals sent along the bus,
   an optical pickup (OPU) subsystem, for obtaining data from the disc; and
   a signal amplifier, servo error detector, servo control subsystem, and a plurality of servo drivers, all connected to the disc motor,
   wherein the disc motor includes two or more spindle motors which rotate the disc to a variety of desired speeds depending on whether a CD or DVD is being operated, various user selections, and internal resistance factors,
   wherein the servo drivers output signals to disc motor to drive and control the rate of rotations of the various motors contained in disc motor, where the servo drivers also output signals to position the OPU on the desired location of the disc to focus the laser beam onto disc and to track the recorded spiral pits on disc;
   and further wherein the bus has an arbitrator and devices connected thereto make bus access requests of the arbitrator prior to obtaining access, where each access request is typically processed according to a priority scheme, which is typically based on the priority given to a specific device and the order in which the bus access requests are received;
   wherein the priority scheme is set up so that no device monopolizes the bus, thereby avoiding the starving of the other devices;
   and further wherein the arbitrator has a queuing module designed to share the bus so that no device attached therein uses more than approximately 40% of the bus's total available bandwidth;
   wherein the various components of the playback system are either located on one integrated circuit die or are separate non-integrated components in any combination;
   wherein the playback system accepts data from pre-fabricated CD/DVD modules that already have all the logic for sensing data from the disc lenses, motors, and optical devices, so that the OPU, motor, error detector, and control subsystem are unused and instead the disc lenses, motors, and optical devices are connected directly to the pre-fabricated disc sensing mechanisms.

2. The device of claim 1, wherein the data manager is optimized to separate and process audio information read from a disc by receiving inputs from signal amplifier and servo error control signals from the servo error detector;
   and further wherein the data manager performs servo operations, bit clock and data extraction, conversion of analog input signals to digital signals, sync detection and demodulation of CD and DVD data, error detection and correction of CD and DVD data, de-scrambling of DVD data, and links directly to the bus.

3. The device of claim 2, wherein the data manager further comprises:
a read channel subsystem;
a CD digital signal processor and an associated memory;
a DVD digital signal processor (DSP) and an associated memory;
a block decoder along with an associated memory, connected to both signal processors;
an Advanced Technology Attachment Packet Interface (ATAPI) interface; and
a host system central processing unit (CPU) connected to the ATAPI interface and the read channel subsystem;
wherein the read channel subsystem extracts bit clock and bit data information commonly associated with CDs and DVDs from the output of the signal amplifier and receives the equalized signal from signal amplifier and converts the analog signal to digital using baseline tracking techniques, where it then extracts clock and data information;
and further wherein the CD-DSP demodulates channel bits read from a CD into data bytes and performs error detection and correction on the data bytes, while a memory coupled to the CD-DSP facilitates de-interleaving, error detection, and error correction operations, and the block decoder performs data block error correction on CD data and converts the data blocks received from CD-DSP into CD blocks.

4. the device of claim 3, wherein the ATAPI interface facilitates the transfer of CD data blocks and DVD sector data to the host system CPU using the system bus, while the MPEG decoder decompresses and separates the compressed audio and video data where most of the decompressed video data is stripped off and discarded, although a minimal amount is interpreted potentially for displaying choices to a user where applicable;
and further wherein the CPU performs various housekeeping functions including register configuration or initial setup of the playback system of the resent invention by providing read and write capabilities for the various registers and memory locations, an also monitors the flow of data within the various components therein, and also assists in controlling the MPEG decoder.

5. The device of claim 4, wherein the ATAPI receives and parses the encoded multimedia bitstream from the block decoder, and the pre-parser determines the substream membership of each data packet from the packet header and routes the packet contents minus identifying fields from the packet header to the appropriate elementary bitstream buffer in memory where they wait on the availability of the associated module to begin being processed, while certain data packets are retrieved directly from the appropriate buffer in memory by the associated module;
and further wherein data packets having variable-length encoded data including compressed audio and video are passed to the post-parser which parses the bitstream syntax and perform elementary operations such as extracting the bit allocation and scaling information from the headers as well as apply that information to convert the variable-length encoded data into fixed-length transform coefficients which are easier for subsequent modules to process.

6. The device of claim 2, wherein the data manager further comprises:
no ATAPI interface;
a read channel subsystem, a CD-DSP preprocessor and a DVD-DSP preprocessor coupled thereto;
a multiplexer for receiving signals from the CD-DSP preprocessor and DVD-DSP preprocessor;
an error code correction and detection (ECCD) subsystem, an MPEG interface;
a single unified multi-port memory connected to all the above devices;
wherein the ECCD subsystem is responsible for performing error detection and correction for both CD and DVD data, and reads CD or DVD data written to the memory subsystem by a CD-DSP preprocessor or a DVD-DSP preprocessor, using non-sequential memory read operations which allow de-interleaving of the data that is read out, and performs error detection and correction on the data as defined by the Red Book standard for CD data and by standards published by the DVD consortium for DVD data, where the corrected data is written back to memory subsystem.

7. The device of claim 6, wherein the memory subsystem provides memory resources for internal operations of the data manager and provides a common memory resource for processing performed by CD-DSP preprocessor, DVD-DSP preprocessor and ECCD subsystem, and provides memory resources for storing data processed by these preprocessors.

8. The device of claim 1, wherein a console display controller retrieves decoded non-stripped digital video data, decodes the information where possible, and communicates with the console display which shows system information, including configuration menus, time, channel volume, language, and scene;
wherein a video processor separates bitmap signals from other non-video data modules and then interprets and displays them onto the console display, and retrieves bitstream information from the bus after being routed through the MPEG interface and the post-parser, decodes that data, and provides all displayable portions of the resulting decoded information to the console display.

9. The device of claim 8, wherein decision making data regarding advancing the DVD is sometimes available which can be parsed and interpreted for the console display controller;
wherein the video processor further comprises a memory is used to buffer, strip, and interpret the video information if possible;
and further wherein a 'φ' symbol or warning beep or noise is displayed if the user makes an illogical choice.

10. The device of claim 8, wherein the audio processor receives audio data from the post-parser through the bus, and is configurable to parse the audio bitstream side information from data header fields and to convert transform coefficients into digital audio samples, and is further configurable to re-assemble LPCM audio data into digital audio samples;
wherein the audio processor may be configured to retrieve audio data directly from the elementary audio bitstream buffer from the post-parser with the permission of the bus arbitrator, or may also be configured to receive audio data directly from the MPEG decoder where it tracks the location of the next byte to be retrieved using an audio bypass buffer pointer, and maintains a loose synchronization with the MPEG decoder to avoid introducing any undesired delays between reproduced audio signals.

* * * * *